(12) United States Patent
Thomas

(10) Patent No.: US 11,766,046 B1
(45) Date of Patent: Sep. 26, 2023

(54) CAKE CUTTER

(71) Applicant: Shawn G. Thomas, Forth Worth, TX (US)

(72) Inventor: Shawn G. Thomas, Forth Worth, TX (US)

( * ) Notice: Subject to any disclaimer, the term of this patent is extended or adjusted under 35 U.S.C. 154(b) by 0 days.

(21) Appl. No.: 17/581,438

(22) Filed: Jan. 21, 2022

Related U.S. Application Data

(60) Provisional application No. 63/139,880, filed on Jan. 21, 2021.

(51) Int. Cl.
*A21C 15/04* (2006.01)
*A47G 21/04* (2006.01)
*A47J 43/28* (2006.01)

(52) U.S. Cl.
CPC ............ *A21C 15/04* (2013.01); *A47G 21/045* (2013.01); *A47J 43/288* (2013.01)

(58) Field of Classification Search
CPC ........ A21C 15/04; A47G 21/045; B26D 3/24; B26D 3/245; A47J 43/288
USPC .......................................................... 30/114
See application file for complete search history.

(56) References Cited

U.S. PATENT DOCUMENTS

| | | | | | |
|---|---|---|---|---|---|
| 2,417,172 | A * | 3/1947 | Norman | .................... | B26B 3/04 30/304 |
| 2,502,982 | A * | 4/1950 | Norman | ................. | B26B 11/00 30/299 |
| 2,598,789 | A * | 6/1952 | Harrell | ................. | A47G 19/265 220/531 |
| 2,600,646 | A * | 6/1952 | Haugland | ................. | B26B 3/04 30/304 |
| 2,841,868 | A * | 7/1958 | O'Brien | ................. | B26D 3/245 D7/693 |
| 3,758,143 | A * | 9/1973 | Godlewski | ............ | A47J 43/288 D7/688 |
| 3,758,148 | A * | 9/1973 | Sowma | ..................... | B60P 3/32 296/26.11 |
| 4,592,139 | A * | 6/1986 | Huang | ................. | A47G 21/045 30/114 |
| D381,244 | S * | 7/1997 | Laib | .............................. | D7/673 |
| D413,050 | S * | 8/1999 | Meyer | ............................ | D7/673 |
| D447,018 | S * | 8/2001 | Meyer | ............................ | D7/693 |
| D592,919 | S * | 5/2009 | Oliwa | ........................... | D7/688 |
| 10,165,900 | B1* | 1/2019 | Rankin, V | ........... | A47G 21/045 |
| 11,090,821 | B2* | 8/2021 | Randall | .................... | B26B 3/00 |
| 2005/0116483 | A1* | 6/2005 | Lang | ................. | A47G 19/265 294/7 |
| 2011/0200729 | A1* | 8/2011 | Caswell | ................ | A47J 43/288 99/537 |

(Continued)

FOREIGN PATENT DOCUMENTS

DE 20109333 U1 * 8/2001 ............. A21C 15/04
SE 1100117 A1 * 2/2011 ............ A47J 43/288

*Primary Examiner* — Laura M Lee
(74) *Attorney, Agent, or Firm* — Kenneth L. Tolar

(57) ABSTRACT

A cake cutter includes a handle having an L-shaped blade extending therefrom. The blade includes a first section axially extending from an end of the handle and a second section perpendicularly extending from a distal end of the first section. Integrally molded with a central portion of each blade section is a raised ridge that is positioned a predetermined distance from either end of the blade section. Accordingly, the user can cut a precisely sized slice of cake or casserole by aligning the ridges with an outer edge of a cake.

3 Claims, 1 Drawing Sheet

(56) References Cited

U.S. PATENT DOCUMENTS

2012/0297548 A1* 11/2012 Solari .................. A47J 43/288
294/7

* cited by examiner ial application
CAKE CUTTER

CROSS REFERENCE TO RELATED APPLICATIONS

This application claims priority of provisional application No. 63/139,880 filed on Jan. 21, 2021, the specification of which is incorporated herein by reference.

BACKGROUND OF THE INVENTION

The present invention relates to a cutting device that allows a user to easily slice a cake into equal servings.

DESCRIPTION OF THE PRIOR ART

Cutting a cake or casserole into substantially equal portions is tedious and difficult. A user typically slices the cake with a carving knife, a spatula, or a cake server by estimating a desired slice size and etching cutting guides on the frosting corresponding to the estimated slice size. The user then cuts along the guides but ultimately the resulting slice sizes are unequal due to inaccurate estimations or cutting techniques.

Furthermore, a conventional cake-cutting tool has a single linear blade requiring the user to cut along at least two lines further increasing the likelihood of unequal slices. Cutting multiple times to create a single slice is tedious and laborious. Moreover, because a serving spatula is required to transfer the slice from a serving tray onto a plate, the slice can easily fall from the spatula onto a counter or floor.

Accordingly, there is currently a need for a device that more easily slices a cake or casserole into equally sized servings. The present invention addresses this need by providing a cake cutter having an L-shaped cutting blade with integral portioning ridges that allow a user to quickly and easily cut a discretely sized slice using a single tool.

SUMMARY OF THE INVENTION

The present invention relates to a cake cutter comprising a handle having an L-shaped blade extending therefrom. The blade includes a first section axially extending from an end of the handle and a second section perpendicularly extending from a distal end of the first section. Integrally molded with a central portion of each blade section is a raised ridge that is positioned a predetermined distance from either end of the blade section. Accordingly, the user can cut a precisely sized slice of cake, casserole, or similar food item by aligning the ridges with an outer free edge of the food item.

It is therefore an object of the present invention to provide a cutter that easily creates equally sized slices of cake or casserole.

It is therefore another object of the present invention to provide a cutter that eliminates the burdensome task of cutting cake with a knife and subsequently serving the slice with a spatula or other utensil.

It is therefore yet another object of the present invention to provide a cake cutter that slices a cake or casserole with a single stroke.

Other objects, features, and advantages of the present invention will become readily apparent from the following detailed description of the preferred embodiment when considered with the attached drawings and the appended claims.

DESCRIPTION OF THE PREFERRED EMBODIMENT

Figure 3:
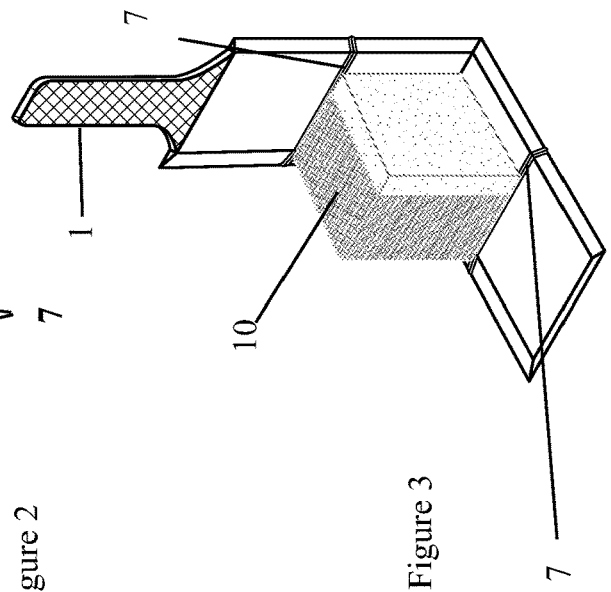
FIG. 3 is a perspective view of the cake cutter serving a discretely sized cake slice.

The present invention relates to a cake cutter comprising a handle 1 having an L-shaped blade 2 extending therefrom. The handle preferably has a textured exterior surface to enhance comfort and grip. The blade includes a first section 3 axially extending from an end of the handle and a second section 4 perpendicularly extending from a distal end of the first section. Each section includes an outer surface, an inner surface, an upper edge 30 and a lower edge 31. Both the upper edge 30 and the lower edge 31 have a tapered cutting strip 6 positioned thereon so that a cutting edge is on the lower edge of the blade irrespective of whether the cutter is held with the right or left hand.

Integrally molded with an intermediate portion of each blade section is a raised reference ridge 7 that extends from the upper edge to the lower edge. The reference ridge 7 is positioned a predetermined distance from either end of the blade section to create a specifically sized cake slice when used as described below. The predetermined distance could be that corresponding to a standard sized cake slice or any uniquely sized slice according to a particular application.

Figure 2:
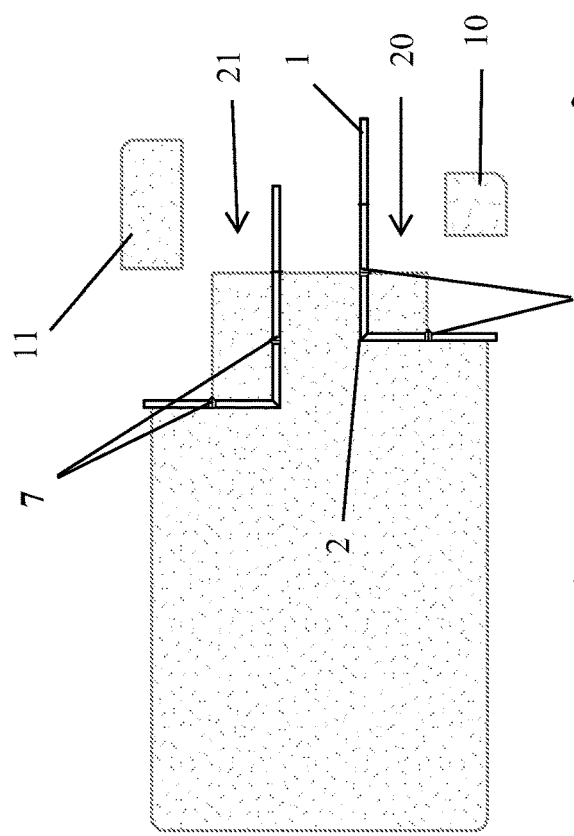
FIG. 2 is a top view of a cake with the cutter creating both square and rectangular slices.
Figure 1:
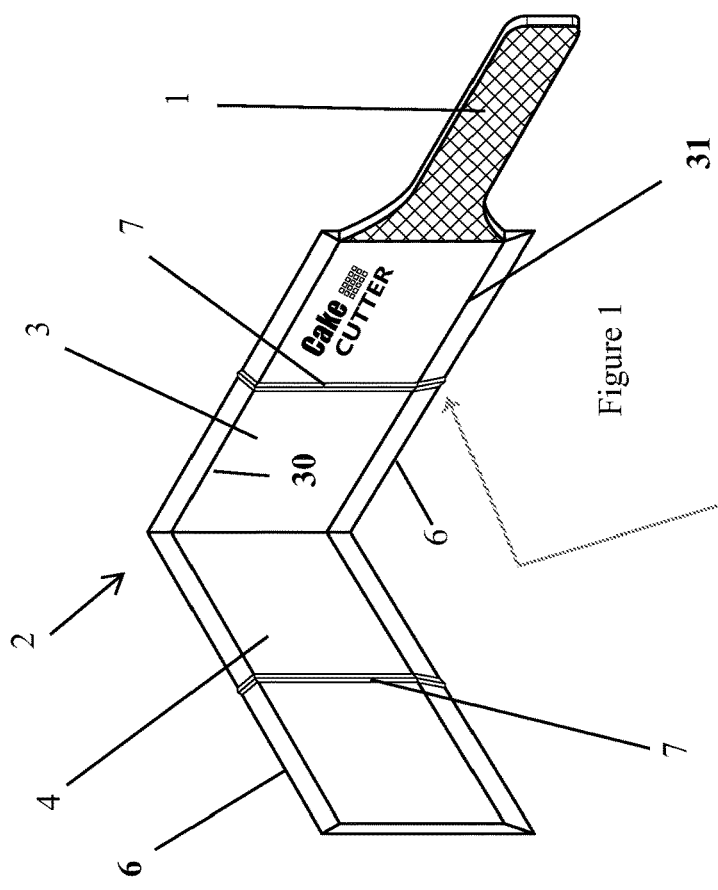
FIG. 1 is an elevated, perspective view of the cake cutter according to the present invention.

Accordingly, the user can cut a precisely sized slice of cake, casserole, or similar food item by aligning the ridges with an outer edge. For example, both ridges are aligned with two perpendicular free edges of the cake to create a square slice 10 as shown at 20 in FIG. 2, or one of the ridges is aligned with one of the free edges and the blade terminus is aligned with the other as shown at 21 in FIG. 2 to create a rectangular slice 11. The L-shaped blade also allows the slice to be easily cut and lifted from a serving tray without the need for a knife and a spatula by rotating the blade ninety degrees, as depicted in FIG. 3. The L-shaped blade is also compactly stored in the corner of a kitchen utensil drawer where it is easily located and will occupy minimal storage space.

The above-described device is not limited to the exact details of construction and enumeration of parts provided herein. Furthermore, the size, shape and materials of construction of the various components can be varied without departing from the spirit of the present invention.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A cake cutter comprising: a handle having a first end and a second end and a longitudinal axis extending between the first end and second end;

an L-shaped blade extending from said first end, wherein said L-shaped blade includes a first section having an upper cutting edge and a lower cutting edge, the upper cutting edge and lower cutting edge extending parallel to the longitudinal axis and said first section axially extending from and coplanar with the first end of said handle, and a second section having an upper cutting edge and a lower cutting edge, said second section perpendicularly extending from a distal end of the first section, said second section having a free end, and wherein the upper cutting edge and the lower cutting edge of the said first section is perpendicular to the upper cutting edge and lower cutting edge of said second section and the width of the first section is substantially the same as the width of the second section;

wherein the upper cutting edge of the first and second section form a coplanar L-shaped upper edge that extends from the handle to the free end of the second section and wherein the lower cutting edge of the first and second sections form a coplanar L-shaped lower edge that extends from the handle to the free end of the second section; and the L-shaped blade further comprises a raised reference ridge extending along an inner surface of an intermediate portion of said first section and said second section, said reference ridges spaced a predetermined distance from an intersection of said first section and said second section and extending from the upper cutting edge to the lower cutting edge of the respective section, said predetermined distance corresponding to a dimension of a desired food item, whereby a user can cut a precisely sized food slice of the food item by aligning said raised vertical reference ridge on either of said first section and said second section with an outer edge of said food item.

2. The cake cutter according to claim 1 wherein said handle has a textured exterior surface to enhance comfort and grip.

3. The cake cutter of according to claim 1, wherein the upper cutting edge and lower cutting edge of both said first section and said second section have a tapered cutting strip positioned thereon, and both the upper cutting edge and the lower cutting edge can be positioned against the food item for cutting the desired food slice.

* * * * *